United States Patent Office 3,277,015
Patented Oct. 4, 1966

3,277,015
AMORPHOUS ALKALI METAL ALUMINATE
John L. Gerlach, Bridgeview, Ill., assignor to Nalco Chemical Company, Chicago, Ill., a corporation of Delaware
No Drawing. Filed Jan. 17, 1964, Ser. No. 338,313
11 Claims. (Cl. 252—363.5)

This invention relates to novel amorphous solid forms of alkali metal aluminates. More specifically, this invention relates to non-crystalline glassy solids which contain from 55% to 75% alkali metal aluminate, based on total weight, with the balance being water and alkali metal hydroxide.

Solid sodium aluminate is well known, and great amounts of the compound are sold annually. It is easy to handle, economical to ship, can be fed directly into a system which is to be treated, with a minimum amount of labor and equipment. Recently however, efforts have been made to make this highly effective chemical even more efficient.

Occasionally, when extreme accuracy is essential, sometimes it develops that a solid sodium aluminate cannot be fed with the proper desired accuracy, even when completely free from moisture and in a discrete solid form. To obtain greater accuracy of treatment control, resort must then be had to the use of liquid sodium aluminate compositions.

Also, the use of a solid aluminate feed directly into the treated system sometimes necessarily results in a time lag before the effectiveness of such aluminates can occur. This is due to the lack of immediate solubilization in the system under control. For example, a solid type aluminate fed into a coagulation zone requires a certain amount of mixing before solubilization can take place completely and effectively. Aqueous systems or partially aqueous systems and particularly those in the quiescent state, under normal operating conditions do not fully and efficiently utilize a solid aluminate product until a certain period of time has elapsed. In fact, in many instances, a solid aluminate must be diluted prior to use, which dilution step is time consuming and uneconomical in many industrial processes. For these reasons, it would be of benefit to the art if a solid form of sodium aluminate which would dissolve more rapidly in water could be made so as to decrease the loss of time.

It therefore becomes an object of this invention to provide a solid sodium aluminate compound, which has noticeably reduced time requirements for solubilization, and a method for making the same.

It is another object of this invention to provide a solid amorphous composition of matter containing 55% to 75% alkali metal aluminate.

Other objects will appear herein.

Any of the well-known alkali metal aluminates can be prepared by the process of this invention, although sodium aluminate is preferred since it is by far the most commercially important aluminate.

The basic process consists of the reaction of alumina ($Al_2O_3$) with an alkali metal hydroxide in the presence of water, to form an alkali metal aluminate of unusual and novel characteristics.

Until this time, all of the solid type aluminates known to exist were crystalline in nature. These compounds were dry crystals of aluminate and water which exhibited definite patterns under X-ray diffraction, depending upon the number of water molecules bound up in the crystal. Commercial forms of sodium aluminate, for example, showed definite clear crystalline patterns with an average of 2.5 moles of water per 2.0 moles of aluminate.

The products described herein however, do not show a crystalline structure when subject to X-ray diffraction. Instead, these novel compounds are homogeneous amorphous glassy solids, ranging from "taffy-like" to brittle forms. The physical nature of these compounds is very much like other glass-like materials, and they do indeed appear to be super-saturated solid solutions of aluminate in water.

Two compounds, one of which is the normal crystalline sodium aluminate and the other a compound of this invention, may under physical analysis, have the same percentage of sodium, aluminum, and water, but will be entirely different in physical appearance. Prior art types of solid sodium aluminate each have a characteristic definite clear reproducible pattern under X-ray diffraction. These are described in A.S.T.M. Special Technical Publication 48M2. Card number 2–1025 of this publication, for example, describes the diffraction pattern of sodium aluminate tri-hydrate. The compounds of this invention, however, are uniform light transmitting solids that give no patterns whatsoever under X-ray diffraction. This is evidence of their amorphous, non-crystalline nature.

Furthermore, a marked difference in rate of solution will be observed. For example, if two equal weights of sodium aluminate are placed in sufficient water to make a 5% solution, the crystalline aluminate will take as long as 20 minutes to dissolve, while the novel amorphous sodium aluminate will dissolve in 14–17 minutes or less under the same conditions. This significant difference in rate of solution graphically indicates that the two solids are not at all the same.

It makes no difference whether sodium or any other alkali metal is used to form the novel amorphous products. The difference between novel crystalline aluminates and the amorphous glasses is still apparent.

It is important in the preparation of compounds of this invention to use relatively pure sources of $Al_2O_3$. It would be most desirable to use pure $Al_2O_3$, but all commercial sources of alumina do contain at least some impurities. If the less pure forms of $Al_2O_3$ are used, a greater tendency to crystallize will make preparation of the novel compounds difficult, if not impossible. It has been found that certain maximum amounts of impurities are tolerable, but beyond these limits, it is impossible to prepare the full range of compounds described hereinafter. The maximum impurities in the $Al_2O_3$ therefore should not exceed 220 parts of metal oxide impurities per million parts of $Al_2O_3 \times 3H_2O$, and more preferably do not exceed a range of 100 to 150 p.p.m. Examples of these metal impurities are oxides of iron, copper, silicon, zinc, gallium, chromium, and nickel. There should also be less than 550 parts of carbon per million parts of $Al_2O_3 \times 3H_2O$. A typical analysis of a preferred alumina source useful in this invention is shown in Table I. All values are in parts per million parts of $Al_2O_3 \times 3H_2O$.

TABLE I

Maximum impurities in $Al_2O_3$ source

| | P.p.m. |
|---|---|
| $Fe_2O_3$ | 56 |
| CuO | 10 |
| $SiO_2$ | 21 |
| ZnO | 6 |
| $Ga_2O_3$ | 13 |
| $Cr_2O_3$ | 12 |
| NiO | 4 |
| Total | 122 |
| Carbon | 514 |

The particular composition of the novel products can most easily be described, within the scope of the invention, by the physical properties of the amorphous solids desired as a final product. It has been found that there are two variables which affect the physical form of the solid aluminate. These variables will produce amorphous solids ranging from hard, brittle, glass-like materials to materials which are very pliable and have flowingness. Products may be stringy and "taffy-like," or they may be almost pourable at room temperatures. At one end of the range, the products approach the crystalline point, and care must be exercised to prevent crystals from forming. At the other end of the range, the product is a quasi-liquid which will approach the liquid form of solution. It is preferred to stay in the middle of both of the variable ranges.

The first variable is the concentration of aluminate in the final product, expressed as concentration of $NaAlO_2$. Products of the invention herein have a composition of from 55% to 75% alkali metal aluminate, calculated as $NaAlO_2$ and based on total weight, and from 25% to 45% water, based on the total weight. The alkali metal aluminate is further characterized as having a ratio of $M_2O/Al_2O_3$ ranging from 1.00 to 1.50, where M is an alkali metal.

As the concentration is increased from a minimum of 55% to a maximum of 75% $NaAlO_2$, based on the weight of the total products, the final product becomes more brittle. If less than a 55% $NaAlO_2$ concentration is used, a liquid will most likely result. If the final concentration of sodium aluminate is more than 75%, crystallization will occur. If other alkali metal aluminates such as lithium aluminate or potassium aluminate are used, the concentration of these aluminates is still calculated as percent $NaAlO_2$ and the same ranges of concentration are found to apply.

The second variable which affects the product form is the initial amount of alkali metal hydroxide used as a starting material in the process of preparing the new composition described above. The basis of calculation is NaOH, although other alkali metal hydroxides may be used. Because of the stoichiometry, it is necessary to use at least a 2.0 molar ratio of NaOH to $Al_2O_3$ in the initial mixture in order to get complete reaction and avoid crystallization. As more hydroxide is used, the product becomes less brittle, and approaches a liquid beyond a molar ratio of 3.0 moles NaOH per mole $Al_2O_3$.

It is often convenient to make use of an approximately direct relationship between the boiling temperature of the alkali metal aluminate solution and its concentration. For example, a 62% sodium aluminate solution, prepared as herein described, boils at about 135° C., a 65% solution boils at about 140° C., and a 67% solution boils at about 146° C. It can be seen in Table II that by stopping at a specific boiling point in the preparation of the product, the effect of concentration on final product form and the trend of increasing brittleness with increased concentration can be seen. All of the products in Table II were formed from an initial molar ratio of NaOH to $Al_2O_3$ of 2.10.

TABLE II

*Effect of concentration of sodium aluminate on final products*

| Boiling point: | Product formed at room temperature |
|---|---|
| 150° C. | Hard brittle glassy solid. |
| 150° C. | Brittle glassy solid. |
| 145° C. | Glassy solid. |
| 140° C. | Pliable glassy solid. |
| 135° C. | Soft pliable glassy solid. |

The effect of the initial sodium hydroxide to sodium aluminate ratio on the final product can also be demonstrated. Table III shows that an increase of excess sodium hydroxide at constant sodium aluminate concentration gives an increase of the pliable quality of the products. The same is true at other concentrations. All of the products in Table III contain a sodium aluminate concentration of 60%, based on total weight.

TABLE III

*Effect of NaOH content in final products*

| Initial ratio of $NaOH/Al_2O_3$: | Product formed at room temperature |
|---|---|
| 2.05 | Pliable soft glassy solid. |
| 2.10 | Very pliable soft glassy solid. |
| 2.15 | Quasi-liquid glassy solid. |

The general process for the preparation of the solids defined in this invention consists of four steps. These steps are the mixing step, the digestion step, the concentration step and the cooling step.

The mixing step consists of the addition of an amount of alumina to a solution of approximately 25% to 45% boiling alkali metal hydroxide in water, such that the ratio of alkali metal hydroxide as NaOH to alumina as $Al_2O_3$ is within a certain range. As mentioned above, the range must necessarily initially be from 2.0 to 3.0 moles of NaOH per mole of $Al_2O_3$. It is preferred that the ratio of NaOH to $Al_2O_3$ be from 2.00 to 2.40.

The digestion step consists of heating and boiling a mixture of alkali metal hydroxide, water, and alumina at a temperature of 100° C. to 130° C., for sufficient time to insure that substantially all of the alumina is converted to alkali metal aluminate. The temperature range will be indicated by the boiling temperature of the mixture, and should be maintained within this range by the addition of water when necessary. It is preferred that this step be carried out at a temperature of 115° C. to 125° C., in order to achieve closer control and a more uniform production of aluminate. Agitation may be provided, although in some cases the vigorous boiling provides sufficient mixing. Concentration at the preferred temperature ranges from 45% to 53% $NaAlO_2$, based on total weight.

The third step, the concentration step, requires that the solution, after digestion, be rapidly concentrated to an alkali metal aluminate concentration of from 55% to 75% based on total weight. Generally, this concentration step should be finished in from 10 minutes to one hour, depending upon the heat transfer coefficients and final conditions. It is preferred that this step take no longer than ½ hour. It is essential that the concentration be increased rapidly to prevent the formation of crystals.

The cooling step consists essentially of cooling the liquid alkali metal aluminate solution to solidification by any means which is convenient. The cooling may be affected by heat exchange within the vessel, or by allowing the digested solution to stand until cool. Since the final product is a solid, it may be found practical in some cases to transfer the product as a liquid, while still hot, to drums or other suitable storage containers, and allow cooling to take place after packaging. In other instances, it may be desirous to cool the product until solid and then package or store the solid aluminate. What is important in this step is that once the final desired concentration is reached, boiling should be stopped and the product should be cooled until solid. The rate of cooling has not been found to be critical.

*Example 1*

A specific example of preparation of a typical compound of this invention is shown as follows:

(1) To a beaker, fitted with a heating element, 337 grams of a 50% sodium hydroxide aqueous solution were charged, diluted to 35% with water, and brought to a boil.

(2) To the above mixture, 195 grams of $Al_2O_3$ and 105 grams water were added and the mixture was boiled at 120° C., for two hours, adding water when necessary to maintain the temperature at that level. The $Al_2O_3$ of Table I was used.

(3) After two hours of digestion, the aluminate was concentrated rapidly to 67% sodium aluminate, based on total solids (approximately 145° C.). Twenty minutes were required for this step.

(4) After concentration, the liquid sodium aluminate solution was poured into a second beaker, and allowed to cool.

The product formed in the above example was a glassy solid, with an amorphous character and was readily soluble in water. Analysis showed 67.0% $NaAlO_2$, 29.7% $H_2O$, and 3.3% NaOH, based on the total weight. The ratio of $Na_2O/Al_2O_3$ was 1.10. At least ¼ less time was required to solubilize such an amorphous solid than was required for a like amount of crystalline solid sodium aluminate.

What is claimed is:

1. A non-crystalline solid alkali metal aluminate which is amorphous as evidenced by transmission of no pattern whatsoever under X-ray diffraction, and which consists of (1) from 55% to 75% of alkali metal aluminate, calculated as $NaAlO_2$ and based on the total weight of the solid non-crystalline aluminate, said alkali metal aluminate having a ratio of $M_2O/Al_2O_3$ of from 1.00 to 1.50, where M is an alkali metal, and (2) from 25% to 45% water, based on the total weight of the solid non-crystalline aluminate.

2. The aluminate of claim 1 where said ratio ranges from 1.00 to 1.20.

3. The aluminate of claim 1, where the percent of alkali metal aluminate is from 60% to 70%, calculated as $NaAlO_2$ and based on the total weight of the solid.

4. The aluminate of claim 1 wherein the alkali metal is sodium.

5. The method of producing an amorphous solid alkali metal aluminate, which comprises the following steps:

A. Adding to a boiling solution of from 25% to 45% alkali metal hydroxide in water, calculated as NaOH, an amount of alumina, such that the initial ratio of NaOH to $Al_2O_3$ is from 2.00 to 3.00, said $Al_2O_3$ having an amount of total metal oxide impurities of less than 220 parts of metal oxide per million parts of $Al_2O_3$ x $3H_2O$, and said $Al_2O_3$ further having less than 550 parts of carbon impurities per million parts of $Al_2O_3$ x $3H_2O$;

B. Heating and boiling said mixture of alkali metal hydroxide, water, and alumina at a temperature of from 100° C., to 130° C., for sufficient time to insure substantially complete digestion of said alumina into an alkali metal aluminate solution.

C. Concentrating the solution after digestion to an alkali metal aluminate concentration based on total weight of from 55% to 75%, said concentration calculated as percent $NaAlO_2$, and said concentration step taking less than one hour.

D. Cooling the concentrated alkali metal aluminate until solid.

6. The method of claim 5, where the initial ratio of NaOH to $Al_2O_3$ is from 2.00 to 2.40.

7. The method of claim 5 where the digestion is carried out at a temperature of 115° C., to 125° C.

8. The method of claim 5 where the final concentration of the alkali metal aluminate is from 60% to 70%, calculated as $NaAlO_2$.

9. The method of claim 5 where the alkali metal aluminate is sodium aluminate and the alkali metal hydroxide is sodium hydroxide.

10. The method of claim 5 where the metal oxide impurities are selected from the groups consisting of oxides of iron, copper, silicon, zinc, gallium, chromium, and nickel.

11. The method of claim 5 where the metal oxide impurities do not exceed a range of 100 to 150 parts per million parts $Al_2O_3$ x $3H_2O$.

References Cited by the Examiner

UNITED STATES PATENTS

| | | | |
|---|---|---|---|
| 1,931,374 | 10/1933 | Clark et al. | 23—52 |
| 2,926,069 | 2/1960 | Perrin et al. | 23—52 |

LEON D. ROSDOL, *Primary Examiner.*

JULIUS GREENWALD, *Examiner.*

J. T. FEDIGAN, *Assistant Examiner.*

UNITED STATES PATENT OFFICE
CERTIFICATE OF CORRECTION

Patent No. 3,277,015            October 4, 1966

John L. Gerlach

It is hereby certified that error appears in the above numbered patent requiring correction and that the said Letters Patent should read as corrected below.

Column 3, line 62, for "150°" read -- 155° --.

Signed and sealed this 5th day of September 1967.

(SEAL)
Attest:

ERNEST W. SWIDER            EDWARD J. BRENNER
Attesting Officer            Commissioner of Patents